June 28, 1966 R. C. BERRY ETAL 3,258,513
METHOD OF MAKING POROUS AND PERMEABLE SHEET MATERIAL
Filed Sept. 5, 1962
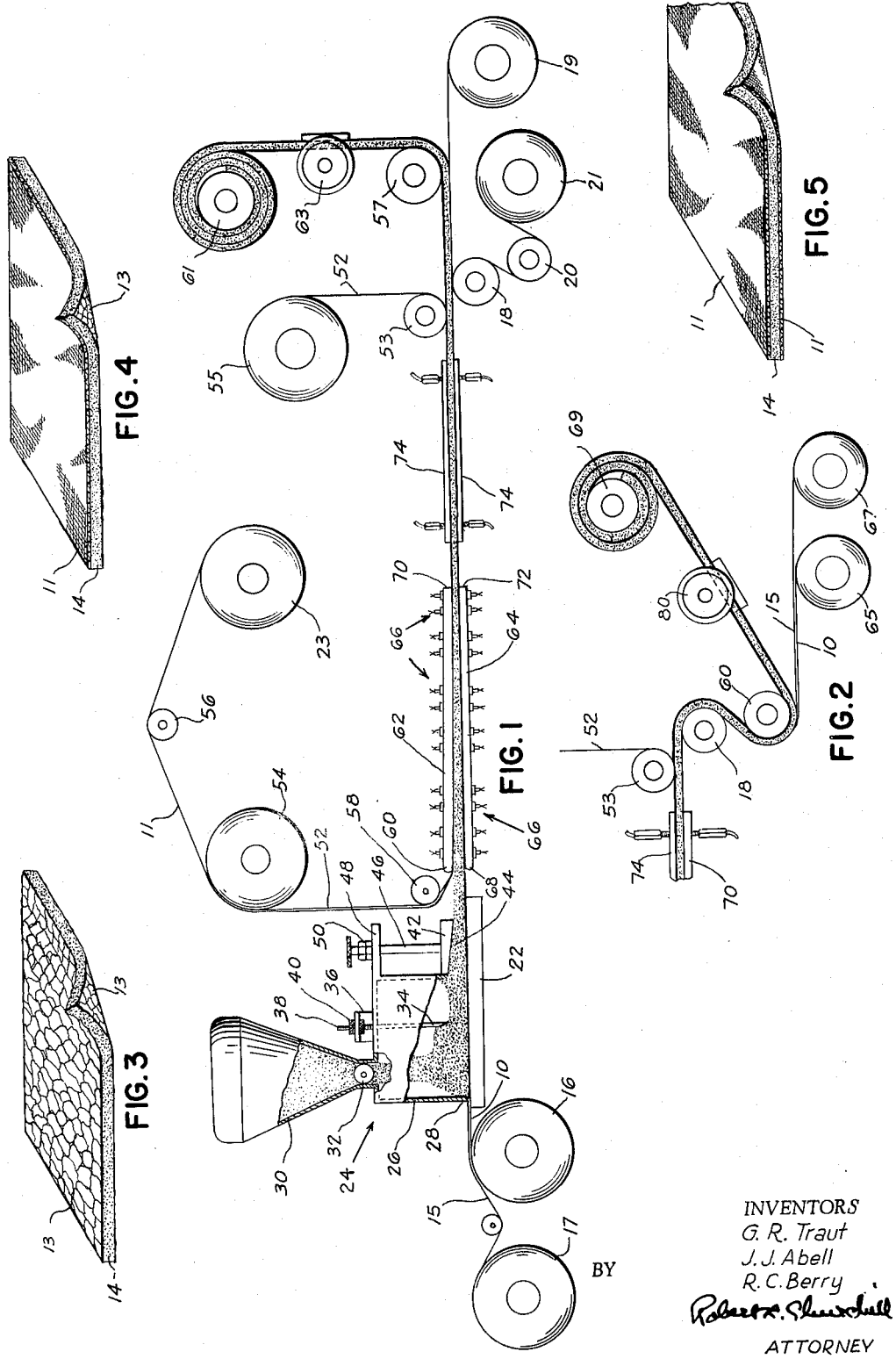
INVENTORS
G. R. Traut
J. J. Abell
R. C. Berry
BY Robert A. Churchill
ATTORNEY

United States Patent Office 3,258,513
Patented June 28, 1966

3,258,513
METHOD OF MAKING POROUS AND PERMEABLE SHEET MATERIAL
Richard C. Berry, Danielson, Jerrold J. Abell, Putnam, and George R. Traut, Danielson, Conn., assignors to Rogers Corporation, Rogers, Conn., a corporation of Massachusetts
Filed Sept. 5, 1962, Ser. No. 221,555
5 Claims. (Cl. 264—112)

This invention relates to a porous and permeable sheet material embodying a sintered plastic material and to a method of making the same.

The invention has for an object to provide a novel and improved permeable porous sheet material.

Another object of the invention is to provide a novel and improved method of manufacturing a porous and permeable plastic sheet material of the type illustrated and described in a copending application of Walter W. Yarrison, Serial No. 829,443, filed July 24, 1959, now Patent No. 3,067,469, issued December 11, 1962, the improvement comprising a method of applying various surface treatments to a sintered plastic material during the manufacture thereof including either a fabric surfaced facing material wherein the fabric is mechanically bonded to the sintered plastic material during the manufacture thereof and/or an embossed surface is applied to the sintered plastic material during the manufacture thereof.

With these general objects in view and such others as may hereinafter appear, the invention consists in a permeable porous sheet material and in the method of applying various surface treatments to the porous and permeable plastic material during the manufacture thereof as hereinafter described and particularly defined in the claims at the end of this specification.

In the drawings illustrating the preferred embodiment of the invention:

FIG. 1 is a diagrammatic view in side elevation of one form of sheet forming apparatus which may be used with advantage in practicing the present invention;

FIG. 2 is a diagrammatic view illustrating a modified form of a portion of the apparatus shown in FIG. 1; and FIGS. 3, 4 and 5 are perspective views of the material produced in accordance with the present method and illustrating the various surface treatments applied to the sintered plastic material during the manufacture thereof.

The present invention contemplates an improvement in the manufacture of porous and permeable sheet materials whereby various surface teratments may be applied to the sheet materials during the manufacture thereof. In practicing the invention illustrated and described in the Yarrison application, Serial No. 829,443, Patent No. 3,067,469, above referred to, granules of a thermoplastic resin are deposited as a uniform layer on the surface of a resilient porous fibrous carrier sheet, and a second resiliently compressible fibrous carrier sheet is laid down on the resin particle layer. This assembly is then passed between heated plates defining a passageway of diminishing thickness, the plates being heated to a temperature which will supply heat through the fibrous carrier sheets to raise the resin particles of the layer to sintering temperature within the time required for a given portion of the assembly to pass between the heated plates. The heated plates are spaced a distance apart at the entry corresponding substantially to the thickness of the assembly before heating and are spaced at the exit at a distance less than that at the entry to supply heat and pressure to sinter together the resin particles.

It appears that the reduction in rate of heat supplied to the particles of resin by reason of the insulating character of the fibrous carrier sheets of the assembly prevents the sharp temperature differential which would exist between the temperature of resin particles in contact with a heated metal surface and the temperature of resin particles spaced from the metal surface. Thus, the particles in the resin layer are more nearly uniform in temperature so that sintering pressure forms a strong uniformly sintered sheet. Also, because the surface granules are not overheated and because of the yielding nature of the fibrous carrier sheets, the surface granules are not flattened out and hence there is preserved a greater degree of porosity and permeability at the surface of the sintered resin sheet.

In accordance with the present invention, one form of surface treatment applied to the material during the manufacture thereof includes combining a permeable facing sheet, such as a fibrous sheet, which may be knit, woven or non-woven, paper, and the like with the permeable porous plastic structure simultaneously with the manufacture of said structure and without destroying the porosity or permeability of said structure. The fibrous facing sheet applied may be bonded to the porous plastic with or without the use of adhesive. While improved bonding results from the use of adhesive, the fine particles of plastic from which such porous plastic structures are manufactured tend to become interspersed with the surface fibers of some facing materials and are then fused together around said fibers, thus giving mechanical bonding as opposed to adhesive bonding.

In accordance with one feature of the present invention, the granules of thermoplastic resin are deposited directly onto the surface of a fibrous facing sheet which is to be bonded to the porous plastic material, the fibrous facing sheet being laid on top of the resilient carrier sheet. When a fibrous facing sheet is to be applied to one side only, such as to the underside of the porous plastic material, a second resilient carrier sheet is laid down on top of the resin particle layer. This assembly is then passed between heated plates defining a passageway of diminishing thickness to raise the resin particles of the layer to sintering temperature to produce the composite structure of a permeable fibrous facing sheet bonded to the permeable porous plastic layer.

When it is desired to apply the fibrous facing sheet to the upper surface of the porous plastic material the thermoplastic resin particles are deposited on the lower fibrous carrier sheet, and the fibrous facing sheet is laid on top of the resin particles, a second or upper carrier sheet being placed on top of the facing sheet. When it is desired to bond a fibrous facing sheet to both sides of the porous plastic material the thermoplastic resin particles are deposited on the facing sheet laid on top of the lower carrier sheet, a second facing sheet is laid on top of the resin particles and a second or upper carrier sheet is placed os top of the upper facing sheet. These assemblies may likewise be passed between the heated plates to produce a composite porous plastic sheet with the facing sheet or sheets bonded thereto.

In other words, the present method involves the interposition of the facing sheet between the porous plastic layer and the compressible fibrous carrier sheet. Neither the upper or lower carrier sheets are treated with adhesive since they are subsequently stripped from the assembly. The fibrous facing sheets may and preferably will be treated with adhesive to improve the bonding results. In practice the engaging surface of the fibrous facing sheet may be treated with a bonding agent which may comprise a discontinuous deposit of resinous material which will permit passage of water vapor and/or air through the assembly. The type of adhesive and the manner of applying the same may comprise that described in the copending Yarrison application above referred to.

In accordance with another feature of the present invention the granules of thermoplastic resin may be deposited directly on a flexible embossing sheet having the desired surface finish or texture to be applied to the porous plastic material, the embossing sheet being laid on top of the resiliently compressible fibrous carrier sheet. When the porous plastic material is to be embossed on its underside only a second resiliently compressible fibrous sheet is laid down on the upper surface of the resin particle layer. By inserting a second embossing sheet between the upper surface of the resin particle layer and the upper carrier sheet both sides of the layer may be embossed, and by eliminating the lower embossing sheet the upper surface only of the layer will be embossed. These assemblies may likewise be passed between the heated plates to produce a porous plastic sheet embossed with the surface finish or design desired. The flexible embossing sheet having the desired surface finish or texture may be of any suitable material having a melting point high enough not to be affected by the sintering of plastic particles, and the embossing surface of the sheet must be such as to adhere weakly enough to the sintered material to be readily separated at the end of the sintering operation. Such surfaces as mate, glossy, or various embossed patterns, such as leather grains, fabric weaves, sandpaper or other decorative embossed patterns may be applied by the present method. Thus, it will be seen that the embossing step also involves the interposition of the embossing sheets between the resin particle layer and the carrier sheets to apply the desired surface treatment to the sintered plastic material during the manufacture thereof. It will also be apparent that the present method enables one side of the porous plastic layer to be provided with a fibrous facing and the other side simultaneously provided with an embossed surface during the manufacture of the porous plastic material.

Fibrous carrier sheets useful herein include porous resiliently compressible fiberboards, particularly rubber and/or resin impregnated fiberboards, woven fabrics, and non-woven fabrics. It is important that the carrier sheets be of substantial strength and firmness. It is further important that they be resistant to distortion under the temperature and pressure conditions encountered in sintering the plastic granules. Commercially available synthetic rubber impregnated fibrous sheet material of the kind used for inexpensive insoles, suitably from about .02 to about .06 inch in thickness, has been found very satisfactory.

Referring now to the drawings and particularly to FIG. 1, the preferred apparatus for practicing the present invention may be similar to that shown in the Yarrison application, above referred to, with various modifications as will be hereinafter described. The form of the apparatus shown in FIG. 1 is arranged to bond a fibrous facing sheet 11 to the upper surface of the porous plastic layer 14 and to provide an embossed design 13 on the underside or lower surface of the layer as illustrated in FIG. 4. A carrier sheet 10 is withdrawn from a roll 16 thereof and is pulled through successive stations by the driven "S" rolls 18, 20 and onto a rewind roll 21 at the end of the sintering operation and, simultaneously therewith, an embossing sheet 15 is withdrawn from a roll 17 and laid on top of the carrier sheet 10 to be pulled through successive stations by the driven rewind roll 19. From the rolls 16, 17 the superimposed sheets 10, 15 first pass over a rigid table 22 beneath a plastic granule spreading and initial compaction device 24. The device shown comprises an open bottomed box 26 of which the lower edges of the sides are joined to the table, and the lower edge 28 of the entering end of the box is spaced from the table 22 to provide a clearance for passage of the carrier sheet 10 and the embossing sheet 15. A hopper 30 containing the plastic granules is mounted at the top of the box 26 and is fitted at its lower end with a feeder 32 which passes plastic granules at a controllable rate into the box 26 and onto the moving embossing sheet 15 in the box 26. The granules on the embossing sheet are carried forward by the sheet and are spread in an even layer at a desired thickness by the blade 34 which is supported by the bracket 36 and is adjustable vertically by the threaded rod 38 and knurled nut 40. The blade 34 is adjusted to control the thickness of the layer of granules carried past it, and the feeder 32 is operated to maintain a small accumulation of granules before the plate 34 to insure that the embossing sheet 15 is uniformly covered with granules to the desired depth. The thickness of the layer of the granules passing the blade 34 is controlled to insure maintenance of a small accumulation of plastic granules at the exit end of the box 26 before the initial compaction.

Thermoplastic resins suitable for use in the present method may comprise those disclosed in the Yarrison patent above referred to and to which reference may be made. The layer of resin granules is carried by the embossing sheet 15 beneath the uniforming and initial compaction member 42 extending across the exit end of the box. This uniforming and compaction member is a rigid metal member having a smooth lower face 44 extending at a slight angle, which may be of the order of 10°, to the embossing sheet 15 to define with the embossing sheet a path of diminishing cross section. The lower face 44 may be, for example, 2" wide so that the edge adjacent the box is 0.442" further from the embossing sheet than is the opposite edge. Depending on the spacing of the face 44 from the embossing sheet, the thickness of the layer of granules may be from 3 to 8 times as great at the edge adjacent the box 26 as at the opposite end. The reduction in thickness is due largely to reduction in the amount of resin carried past the member; but the layer of granules is somewhat compacted, and any voids in the layer are filled in in passing beneath the compaction member 42. The uniforming and initial compaction member 42 is carried by the rod 46 which is adjustable heightwise in the bracket 48 by means of adjusting nuts 50. The uniforming and initial compaction member 42 is adjusted to spread the granules in a layer containing from about 0.05 to about 1.5 pounds of resin per square foot of embossing sheet, preferably from 0.06 to 0.20 pound per square foot.

The fibrous facing sheet 11 to be bonded to the upper surface of the porous plastic layer 14 is withdrawn from a roll 23, passes over guide roll 56, upper carrier sheet roll 54 and guide roll 58 and is brought down against the upper surface of the layer of resin granules by the rounded leading edge 60 of the plate 62. Simultaneously therewith, the upper carrier sheet 52 is withdrawn from the roll 54 and passes over guide roll 58 and under the plate 62 on top of the fibrous facing sheet 11. The assembly of lower carrier sheet 10, embossing sheet 15, plastic granules 12, fibrous facing sheet 11 and upper carrier sheet 52 passes between the plates 62, 64 which are heated to from about 300° to about 400° F. by the electrical heating unit 66 to supply the heat required to sinter the plastic granules. The plate 62 is spaced from the lower plate 64 at their leading ends 60 and 68 an amount greater than the spacing of the plates at the trailing ends 70 and 72 to reduce the thickness of the layer of plastic granules to provide a ratio of initial thickness to final thickness in the range of from about 4:1 to about 2:1. The greater the percentage compaction, the greater the increase in density and the lower the porosity.

Heat from the heated plates 62 and 64 must pass through the upper and lower carrier sheets 52 and 10 and through their respective facing or embossing sheets 11, 15, respectively, before raising the temperature of the plastic granules to sinter them under the applied pressure into a microporous layer. Because the rate of heat transmission through the lower and upper fibrous carrier sheets and their respective facing or embossing sheets is comparable to the rate of heat transfer in the granule layer, there is no localized overheating of the granules at the boundary between the sheets and the surfaces of the granule layer. Likewise, the sheets are somewhat compressible as contrasted to metal surfaces. These factors cooperate to prevent excessive flattening and spreading of the granules on the surfaces of the layer of plastic granules so that the porosity of the surfaces of the plastic layer is preserved.

The length of the heated plates 62 and 64 used will depend on the rate of movement of the assembly, the temperature of the plates, the thickness of the resin layer, the thickness of the carrier sheet 10, embossing sheet 15, carrier sheet 52 and fibrous facing sheet 11 and the sintering temperature of the resin.

The fibrous facing sheet 11 may and preferably will be provided on its inner or layer engaging face with a suitable adhesive of the type as hereinbefore described to effect firm bonding of the fibrous facing sheet to the sintered resin layer without destroying the permeable porous characteristics of the plastic layer 14.

After passing between the heated plates 62, 64 the assembly is then cooled by passage thereof between cold plates 74 spaced apart a distance corresponding to the thickness of the assembly. After the cooling operation the lower carrier sheet 10 is stripped from the assembly by the "S" rolls 18, 20 and the rewinding roll 21, and the embossing sheet 15 is likewise stripped from the assembly by driven rewinding roll 19. The upper carrier sheet 52 is also stripped from the assembly by passing around guide roll 53 and onto driven rewinding roll 55. The composite structure comprising the porous plastic layer having a fibrous sheet bonded to one face thereof and embossed on the other face thereof passes around guide roll 57 and onto driven winding roll 61. During such passage the edges of the composite sheet may be trimmed by driven rotary knives 63 as indicated in FIG. 1.

FIG 2 illustrates a modified form of the sheet rewinding apparatus wherein the upper carrier sheet 52 may be stripped from the assembly by passing around guide roll 53 to be rewound as before, but the remainder of the assembly passes around the "S" drive rolls 18, 20 whereupon the lower carrier sheet 10 and the embossing sheet 15 are rewound on driven rolls 65, 67, respectively, while the composite sheet is wound onto driven roll 69 after passing the trimming knives 80

From the above description of the apparatus for practicing the present method wherein an embossing sheet 15 is interposed between the lower carrier sheet 10 and the plastic material to effect application of an embossed surface decoration to one side of the sintered plastic layer and wherein a fibrous facing sheet 11 is interposed between the plastic material and the upper carrier sheet 52 to effect bonding of the fibrous sheet to the other side of the sintered plastic layer 14, it will be evident that the apparatus may be modified to produce a porous plastic sheet having embossed surfaces 13 on both sides of the porous plastic layer 14, as shown in FIG. 3, or that the apparatus may be modified to produce a porous plastic sheet having a fibrous facing sheet 11 bonded to both sides of the porous plastic layer 14. Modifications to produce other variations will also be apparent, such as the bonding of the fibrous facing sheet to either the top or bottom surface of the porous plastic layer with the opposing side plain or without embossing, or the application of an embossed surface to either the top or the bottom surface of the porous plastic layer, with the opposing side plain or untreated.

While the preferred embodiment of the invention has been illustrated and described, it will be understood that the invention may be embodied in other forms within the scope of the following claims.

Having thus described the invention, what is claimed is:

1. The method of manufacturing a microporous sheet of resin and simultaneously imparting a desired surface finish or texture to at least one surface thereof during the manufacture of the sheet without harming the permeable porous character of the sheet wherein a uniform layer of fine granular thermoplastic resin is carried between upper and lower resiliently compressible fibrous carrier sheets and passed between heated plates defining a passageway of diminishing thickness to apply heat and pressure to sinter the granules together into a microporous layer, the improvement comprising the step of interposing a sheet adapted to impart a desired surface finish or texture to the microporous layer, between the microporous layer and said carrier sheets, said desired surface finish or texture being applied to the microporous layer during the sintering of the microporous layer.

2. The method as defined in claim 1, including the steps of stripping at least one of said carrier sheets and at least one of said interposed sheets adapted to impart a desired surface finish or texture from the assembly.

3. The method of manufacturing a microporous sheet of resin and simultaneously imparting thereto a surface decoration during the manufacture thereof which comprises the steps of spreading fine granular thermoplastic resin in a uniform layer on a decorative fibrous sheet laid over a lower resiliently compressible fibrous carrier sheet whereby to dispose the decorative fibrous sheet between said layer and the lower fibrous carrier sheet, laying down on the exposed surface of said layer an upper resiliently compressible fibrous carrier sheet, passing the resultant assembly between heated plates defining a passageway diminishing in thickness, said heated plates supplying heat and pressure to portions of said assembly passing therethrough to sinter the resin granules together into a microporous layer and to simultaneously bond the decorative fibrous sheet to the undersurface of the layer.

4. The method of manufacturing a microporous sheet of resin and simultaneously applying thereto an embossed surface which comprises the steps of providing a lower resiliently compressible fibrous carrier sheet, laying a separate embossing sheet on top of said lower carrier sheet, spreading fine granular thermoplastic resin in a uniform layer on said embossing sheet, laying down on the exposed surface of said layer an upper resiliently compressible fibrous carrier sheet, passing the resultant assembly between heated plates defining a passageway diminishing in thickness from a thickness at the entry to said passageway approximating the initial thickness of said assembly to a thickness less than said initial thickness at the exit of said passageway, said heated plates supplying heat and pressure to portions of said assembly passing therethrough to sinter the resin granules together in a microporous layer and to impress the embossed design on the layer, cooling the assembly, and then stripping the fibrous carrier sheets and the embossing sheet from said microporous layer.

5. The method of manufacturing a microporous sheet of resin and simultaneously bonding therewith a fabric facing sheet to one surface thereof and imparting an embossed design to the other surface thereof which comprises the steps of providing a lower resiliently compressible fibrous carrier sheet, laying an embossing sheet on top of said lower carrier sheet, spreading fine granular thermoplastic resin in a uniform layer on said embossing sheet, laying down on the exposed surface of said layer a fibrous facing sheet on its engaging face, laying down on said fibrous facing sheet an upper resiliently compressible fibrous carrier sheet, passing the resultant assembly between heated plates defining a passageway diminishing in thickness from a thickness at the entry to the passageway approximating the initial thickness of said assembly to a thickness less than said initial thickness at the exit of said passageway, said heated plates supplying heat and pressure to portions of said assembly passing therethrough to sinter the resin granules together in a microporous layer and to impress the embossed design on one surface of the layer and to effect interspersion of the sintered plastic with the surface fibers of said fibrous facing sheet, and fusing the material around said fibers to effect bonding of the fibrous sheet to the other surface of the layer, cooling the assembly, and stripping the fibrous carrier sheets and the embossing sheet from said microporous layer.

References Cited by the Examiner

UNITED STATES PATENTS

| | | | |
|---|---|---|---|
| 1,384,808 | 7/1921 | Shiner | 161—73 |
| 2,287,159 | 6/1942 | Zinser | 161—73 |
| 2,404,073 | 7/1946 | Karfiol et al. | 156—209 |
| 2,621,138 | 12/1952 | Messing | 156—209 |
| 3,067,469 | 12/1962 | Yarrison | 264—112 |
| 3,093,525 | 6/1963 | Wilson et al. | 156—79 |

FOREIGN PATENTS 333,161   8/1930   Great Britain.

EARL M. BERGERT, *Primary Examiner.*

H. F. EPSTEIN, *Assistant Examiner.*